(12) United States Patent
Sæterbø et al.

(10) Patent No.: US 7,857,554 B2
(45) Date of Patent: Dec. 28, 2010

(54) SYSTEM FOR CLAMPING A CUTTING HEAD TO AN ADAPTER, A CUTTING HEAD AND A FIXTURE

(75) Inventors: Martin Sæterbø, Flatåsen (NO);
Anders Digernes, Trondheim (NO); Per Bjørvik, Trondheim (NO)

(73) Assignee: Teeness ASA, Trondheim (NO)

( * ) Notice: Subject to any disclaimer, the term of this patent is extended or adjusted under 35 U.S.C. 154(b) by 349 days.

(21) Appl. No.: 11/632,547

(22) PCT Filed: Jul. 15, 2005

(86) PCT No.: PCT/NO2005/000264

§ 371 (c)(1),
(2), (4) Date: Jun. 8, 2007

(87) PCT Pub. No.: WO2006/019305

PCT Pub. Date: Feb. 23, 2006

(65) Prior Publication Data

US 2008/0075541 A1 Mar. 27, 2008

(30) Foreign Application Priority Data

Jul. 22, 2004 (NO) .................................. 20043161

(51) Int. Cl.
*B23B 27/08* (2006.01)
*B23B 27/00* (2006.01)
(52) U.S. Cl. ........................................ 407/101; 407/107
(58) Field of Classification Search ................. 407/107, 407/101, 108, 102, 94, 112, 92
See application file for complete search history.

(56) References Cited

U.S. PATENT DOCUMENTS

| 2,398,913 | A | * | 4/1946 | Anthony et al. | ................ 407/98 |
| 2,453,959 | A | * | 11/1948 | Anthony et al. | ................ 407/96 |
| 3,381,553 | A | * | 5/1968 | Lutz | ........................... 408/168 |
| 3,534,457 | A | * | 10/1970 | Mueller | ...................... 407/101 |

(Continued)

FOREIGN PATENT DOCUMENTS

AU 245808 11/1960

(Continued)

OTHER PUBLICATIONS

Japanese Office Action (translated) dated Apr. 6, 2010 in corresponding Japanese Application No. 2007-522456.

*Primary Examiner*—Will Fridie, Jr.
(74) *Attorney, Agent, or Firm*—Wenderoth, Lind & Ponack, L.L.P.

(57) ABSTRACT

The present invention concerns a system for fixing a cutting head to an adapter for a machine tool. The cutting head includes a first linear flange, a second linear flange substantially parallel to the first linear flange and a unit for holding a cutting bit. A holding jaw is provided for being fixed to the adapter and for engagement with at least one of the linear flanges on the cutting head, and a clamping device for clamping the at least one holding jaw between the at least one flange of the cutting head and the adapter. At least one further clamping device is connected to the adapter for engagement with the second or the linear flanges. Furthermore a cutting head and an adapter is defined.

5 Claims, 4 Drawing Sheets

U.S. PATENT DOCUMENTS

| | | | |
|---|---|---|---|
| 3,811,162 A * | 5/1974 | Bay | 407/108 |
| 3,825,981 A * | 7/1974 | Cochran et al. | 407/101 |
| 3,938,230 A * | 2/1976 | Rice | 407/107 |
| 4,227,838 A | 10/1980 | Berry | |
| 4,332,513 A * | 6/1982 | Gowanlock | 407/101 |
| 4,599,923 A | 7/1986 | Church et al. | |
| 5,079,979 A | 1/1992 | Pano | |
| 5,322,395 A | 6/1994 | Cole | |
| 5,988,952 A * | 11/1999 | Antoun | 407/107 |
| 6,186,704 B1 * | 2/2001 | Hale | 407/101 |
| 6,758,637 B2 * | 7/2004 | Gati | 407/92 |
| 7,419,337 B2 * | 9/2008 | Berminge | 407/101 |

FOREIGN PATENT DOCUMENTS

| | | |
|---|---|---|
| EP | 1 243 365 | 9/2002 |
| JP | 62-201601 | 12/1987 |
| JP | 3-142107 | 6/1991 |
| JP | 6-506399 | 7/1994 |
| JP | 6-507845 | 9/1994 |
| JP | 2004-517744 | 6/2004 |

* cited by examiner

SYSTEM FOR CLAMPING A CUTTING HEAD TO AN ADAPTER, A CUTTING HEAD AND A FIXTURE

BACKGROUND OF THE INVENTION (1) Field of the Invention

The present invention concerns a system for fixing a cutting head to an adapter of a machine tool, a cutting head and an adapter. The invention is intended for use in connection with boring bars and all other similar tool holders used in machine tools. The present invention is particularly adapted for boring bars for internal and external turning.

(2) Description of Related Art

During turning, vibrations or chatter, occurs due to the natural frequency of a tool being in the same area as the naturally occurring oscillations of the shear forces where the cutting takes place. This creates poor quality of the finished surface, noise and work piece poor accuracy. Technology has been developed to attenuate such vibrations by optimizing the ratio between strength and mass of the cutting head. This technology is described in patent number U.S. Pat. No. 7,121,768 of the applicant. The cantilevered length can be increased with this technology. Such cutting heads are intended to be clamped to an adapter or a boring bar.

During machining with a machine tool it will, in many cases, be desirable to change a cutting head quickly.

From the patent literature holders for cutting tools of various type are known. U.S. Pat. No. 3,811,162 discloses a clamping holder including a longitudinal track with a dove tail shaped cross section for in a longitudinal direction to take up a cutting tool with a quadratic steel bar to be secured to the notch, and that it includes a wedge-shaped liner that is clamped to this notch. Wedges and screws are shown to secure the tool. This patent, however, does not describe adapters and cutting heads for boring bars.

U.S. Pat. No. 5,322,395 discloses a tool with a body defining a first seat secured to an anvil. A cutting insert is held with a clamping body or a holding jaw.

U.S. Pat. No. 4,599,923 discloses a tool holder having a dove tail shaped fixing part for connection to a tool holder. A wedge is used to hold the tool to the tool holder.

EP 1,243,365 discloses a tool holder for boring bars where a tool is put into a groove with various angles for jamming the tool.

None of these publications describe a system for fixing a cutting head to an adapter for a machine tool that is optimized in relation to strength and mass to reduce the limitations in maximum cantilever length, in combination with a fixing system that allows quick change of the cutting head and that provides an infinitely variable adjustment of the F-measure of the cutting bit. The F-measure defines the distance between the centre of the adapter and the cutting bit (the point of the bit). Furthermore, the prior art fails to show a coupling mechanism or a system that is adapted such that the built length for the system not becomes excessive.

SUMMARY OF THE INVENTION

The present invention provides a system, a cutting head and an adapter as defined in the enclosed patent claims, and that defines a system for fixing a cutting head to an adapter for a machine tool, where the cutting head includes a first substantially linear flange, and a second substantially linear flange substantially parallel to the first flange. The cutting head includes means for attachment of a cutting bit. Furthermore the system includes at least one holding jaw for attachment to the adapter and for engagement with at least one of the linear flanges of the cutting head, and at least one fixing device for holding the at least one holding jaw to the adapter and towards the at least one flange of the cutting head, and at least one further clamping device or fixture connected to the adapter for engagement with the second linear flanges.

The clamping device or fixture for clamping the at least one flange of the cutting head to the at least one holding clamp may include a bolt.

The at least one clamping device can be provided by a projection with a keyway mutually adapted to the second linear flange of the cutting head.

The clamping device connected to the adapter for engagement with the second of the linear flanges may include a second holding jaw, and the second holding jaw can be clamped to the adapter with a second bolt.

The cutting head and the adapter can have mutually fitting serrations parallel with the first and the second linear flange.

The cutting head may include a first substantially straight, linear, protruding or longitudinal flange and a second substantially straight, protruding, longitudinal flange substantially parallel to the first flange and a holding device for a cutting bit.

Furthermore, the invention concerns an adapter with two opposingly facing sides, the first side being adapted to face towards a cutting head and the second side being adapted for being secured to a machine tool, and where the side facing the cutting head includes an area for abutting engagement with the cutting head. The adapter includes a further area on each side of the face that is adapted for abutting engagement with the cutting head, where at least one of these areas is adapted for being secured by a holding jaw for engagement with a flange placed on the cutting head.

The area that is adapted for abutting engagement with the cutting head may include a body extending outward from the area, for instance in the form of a threaded peg, for engagement with an adjustment element on the cutting head. The adjustment element can be a screw that is screwed towards the peg. Alternatively, in a longitudinal adjustable direction, a peg in the cutting head may extend into a groove in the cutting head and into a suitable groove or bore in the adapter.

The adapter can be adapted to be secured by a holding jaw on the second area adjacent the area for abutting engagement with the cutting head.

One of the areas on each side of the face is adapted for abutting engagement with the cutting head and may include a holding part with a key way mutually adapted to the second linear flange of the cutting head.

When the invention was designed, quick and time saving change of cutting heads was emphasized. Furthermore, it was emphasized to provide a solution without any loose parts such that the cutting head can be loosened, pulled out to the side, and a new cutting head can be pushed in from the side and be tightened without having to release additional elements from the adapter.

The nozzle or outlet for cutting fluid can be placed high and a bit to the side of the adapter, such that the jet gets well above the clamping mechanism of the cutting bit to always hit the pointed area of the cutting bit. It is a problem that the clamping mechanism on some large cutting bits is bulky and it is very difficult to make the fluid jet for the cutting bit hit the point of the bit. This is solved in the shown solution.

The present invention also provides a cutting head, which is a volume product. An adapter is more of an investment, and according to the invention, it is possible to have a number of cutting heads for various operations for one adapter. Accordingly, the solution according to the present invention is a cost-effective solution. According to the invention, the cutting head can be made substantially simpler and therefore cheaper than other cutting heads. The coupling faces of the cutting head may include simple faces, as opposed to the known solutions where the coupling face for instance has several holes, recessions, keyways and conical faces. The invention ensures that the position of the cutting bit is maintained when the cutting head is changed.

Furthermore it is desirable to provide a product that is easier to use in that the cutting head is easier and quicker to change, the cutting head is cheaper to manufacture, the F-measured between the adapter and the cutting bit can easily be adjusted infinitely, and the position during changing between the various cutting heads can be repeated. The fact that the position the cutting head has on the adapter easily can be repeated, represents a considerable simplification and can give a considerable saving in used time and is accordingly an economic solution.

BRIEF DESCRIPTION OF THE DRAWINGS

Short description of the enclosed figures.

DETAILED DESCRIPTION OF THE INVENTION

In the following the invention will be described in view of the shown embodiments.

Figure 1:
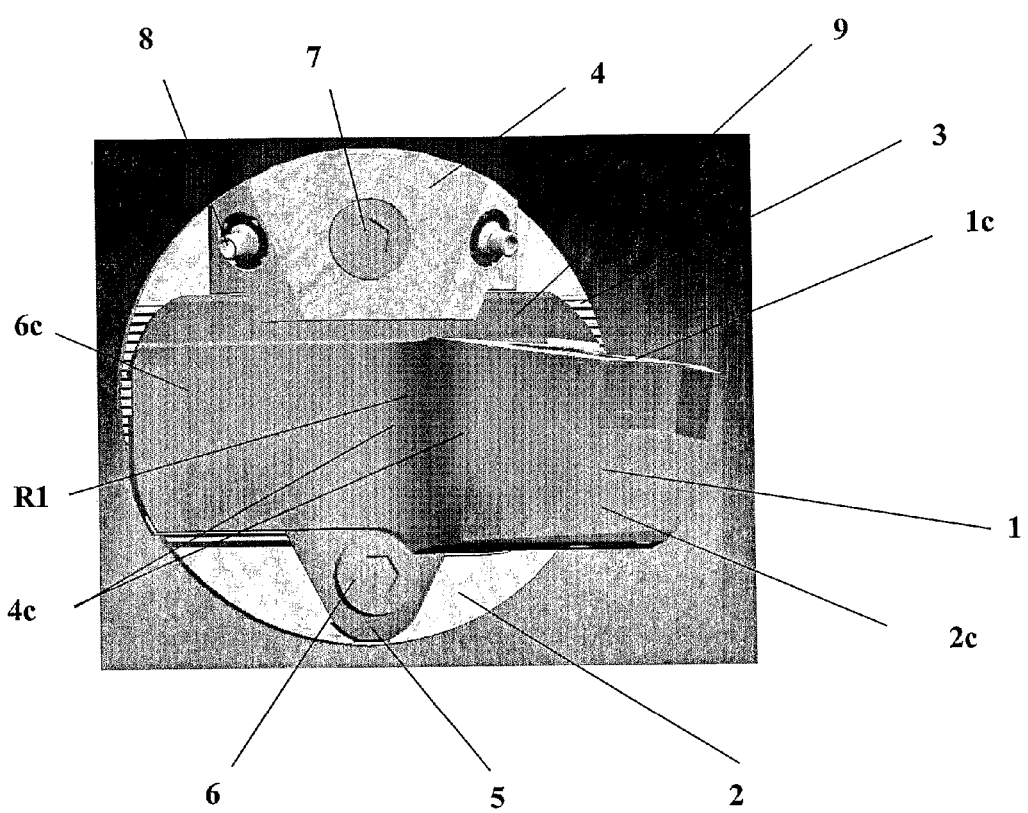
FIG. 1 shows the front side of a cutting head according to one embodiment of the invention.

FIG. 1 shows an attachment device, an adapter 2 and a cutting head 1 according to the invention. The attachment device includes a first or upper holding jaw 4 secured with a clamping device in this case an upper or first bolt 7. The first jaw 4 is equipped with nozzles 8 for a cutting liquid. A lower or second holding jaw 5 is shown fixed to the adapter 2 by a lower or second bolt 6. The cutting head 1 is equipped with means for securing a cutting bit and is shaped with a first flange 9 and a second flange parallel to the first flange, in addition to serrations on the side of the cutting head 1 that is abutting the adapter 2. The adapter 2 is equipped with mating serrations 3 for mutual interlocking engagement with the cutting head 1.

When the cutting head 1 on the adapter 2 is to be changed, the holding bolts 6, 7 can be loosened such that a cutting head 1 can be slid in the direction of the serrations 3 and the parallel flanges and may be exchanged with another cutting head. A new cutting head can be placed on the adapter 2 by sliding it in the same direction as the adapter it replaces was removed. A mechanism (not shown) may ensure that a cutting head receives a predetermined position on the adapter 2. When the cutting head 1 is to be clamped on to the adapter 2, the holding bolts 6, 7 are tightened and the holding jaws 4, 5 thereby press the cutting head 1 towards the adapter 2. The serrations 3 ensure that the localization of the cutting head 1 in relation to the adapter 2 is maintained. The holding jaws 4, 5 are shaped such that they impose a force towards the cutting head 1 and the adapter 2 when the holding bolts 6, 7 are tightened without the holding bolts 6, 7 being exposed to bending moment. This design will be further described with reference to the other embodiments.

The cutting head may, in the other embodiments, include a protrusion 2c with an area for securing a cutting bit and a ramp 1c that provides a room for chips that are created in a cutting process. The protrusion 2c extends from a main part 6c, and the transition between the main part 6c and the protrusion 2c forms an S-shape 4c including a concave and a convex surface facing away from the surface that abuts the adapter 2. The transition between the main part 6c and the protrusion 2c creates a radius R1. The main part 6c may include an angled face in relation to a plane parallel to the coupling face of the adapter 2.

This design contributes to a low weight for the system and results in simple machining of the cutting head which again provides an economic product.

Figure 2:
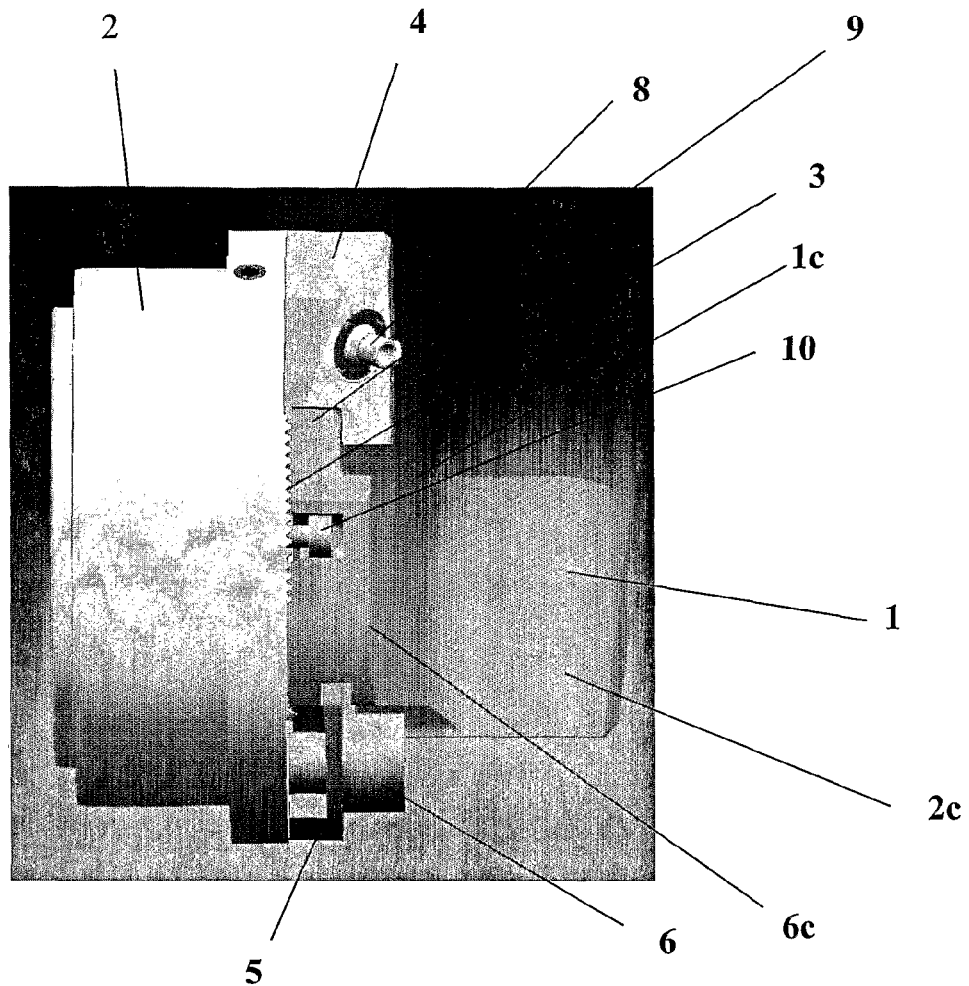
FIG. 2 is a side elevation of the embodiment of the invention shown on FIG. 1.

FIG. 2 shows a side elevation of the embodiment shown on FIG. 1 where the serrations 3 of the adapter 2 and the mutually engaging serrations in the cutting head 1 are clearly shown. Furthermore, it is shown how the upper holding jaw 4 presses towards the flange 9 of the cutting head 1 when the upper holding bolt (not shown on FIG. 2) is tightened. FIG. 2 also shows that the upper holding jaw 4 is recessed in a portion abutting the adapter 2, such that the holding jaw 4 presses towards both the adapter 2 and flange 9 on the cutting head 1 when the upper holding bolt is tightened. Alternatively, the adapter 2 can be recessed, to ensure that the flange 9 is clamped by the holding jaw 4 without the holding bolt being exposed to a bending moment. The holding jaw 4 may in this way form a bridge between the adapter 2 and the upper flange 9 on the cutting head 1, and that is tightened towards these elements by the holding bolt 7.

Similarly the figure shows how the lower holding jaw 5 will clamp the lower flange on the cutting head 1 towards the adapter 2 when the lower holding bolt 6 is tightened. A pin 10 is secured to the adapter 2. An adjustment screw (not shown) in the cutting head 1 can abut pin 10 on the adapter 2 and be used to maintain a position of the cutting head 1 when the cutting head is removed and then repositioned. The adapter 2 is adapted to be secured to a boring bar, or may be a part of the boring bar itself.

Figure 3:
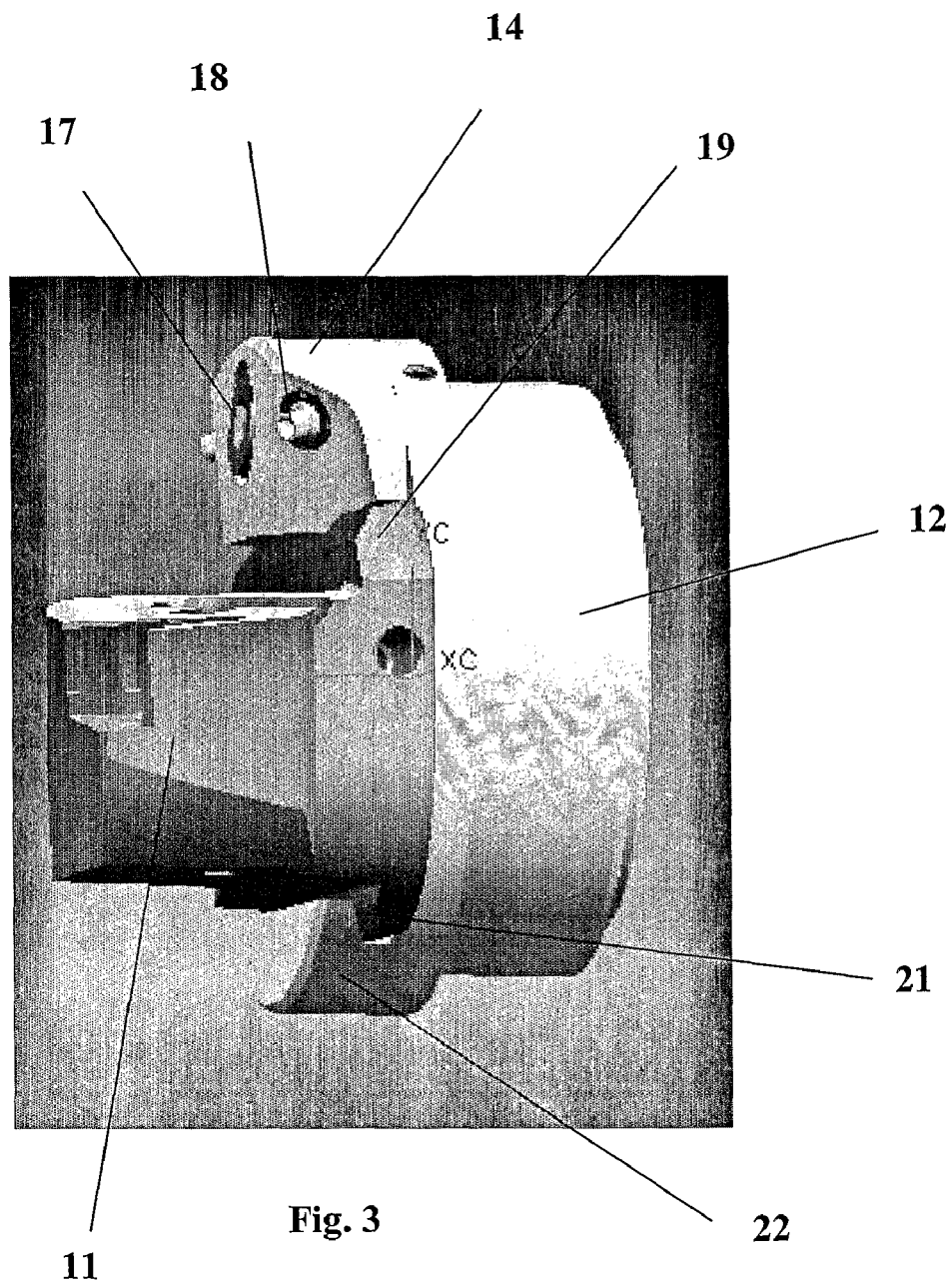
FIG. 3 is a perspective view of a further embodiment of the invention.

FIG. 3 shows another embodiment of the invention where a cutting head 11 for fixing a cutting bit is secured to an adapter 12. An upper holding jaw 14 for clamping the cutting head 11 to the adapter 12 is shown clamped via a holding bolt 17. The holding jaw 14 furthermore includes nozzles 18 for cutting liquid. The cutting head 11 is provided with an upper flange part 19 and a lower flange part 21 for holding the cutting head 11 to the adapter 12. The two flanges 19, 21 are parallel such that a cutting head 11 can be parallelly displaced in the adapter 12. The flanges 19, 21 are shown with a wedge shape in a transversal direction such that the cutting head 11 can be wedged down in a corresponding holding part 22 with keyways in the adapter 12 and in the holding jaw 14. The holding part 22 substitutes the lower holding jaw 5 shown in FIGS. 1 and 2. The holding bolt 17 is shown placed somewhat at an angle in relation to the face between the adapter 12 and the cutting head 11 to press the cutting head 11 into the wedge shaped holding part 22 of the adapter 12 at the same time as the cutting head 11 is pressed towards the adapter 12. A boring in the cutting head 11 is shown for further installation of an adjustment screw adapted to abut a pin in the adapter 12, to be able to adjust the position of the cutting head in relation to the adapter, and to thereby maintain a position after removal and reinstallation of the cutting head 11 on the adapter 12.

Figure 4:
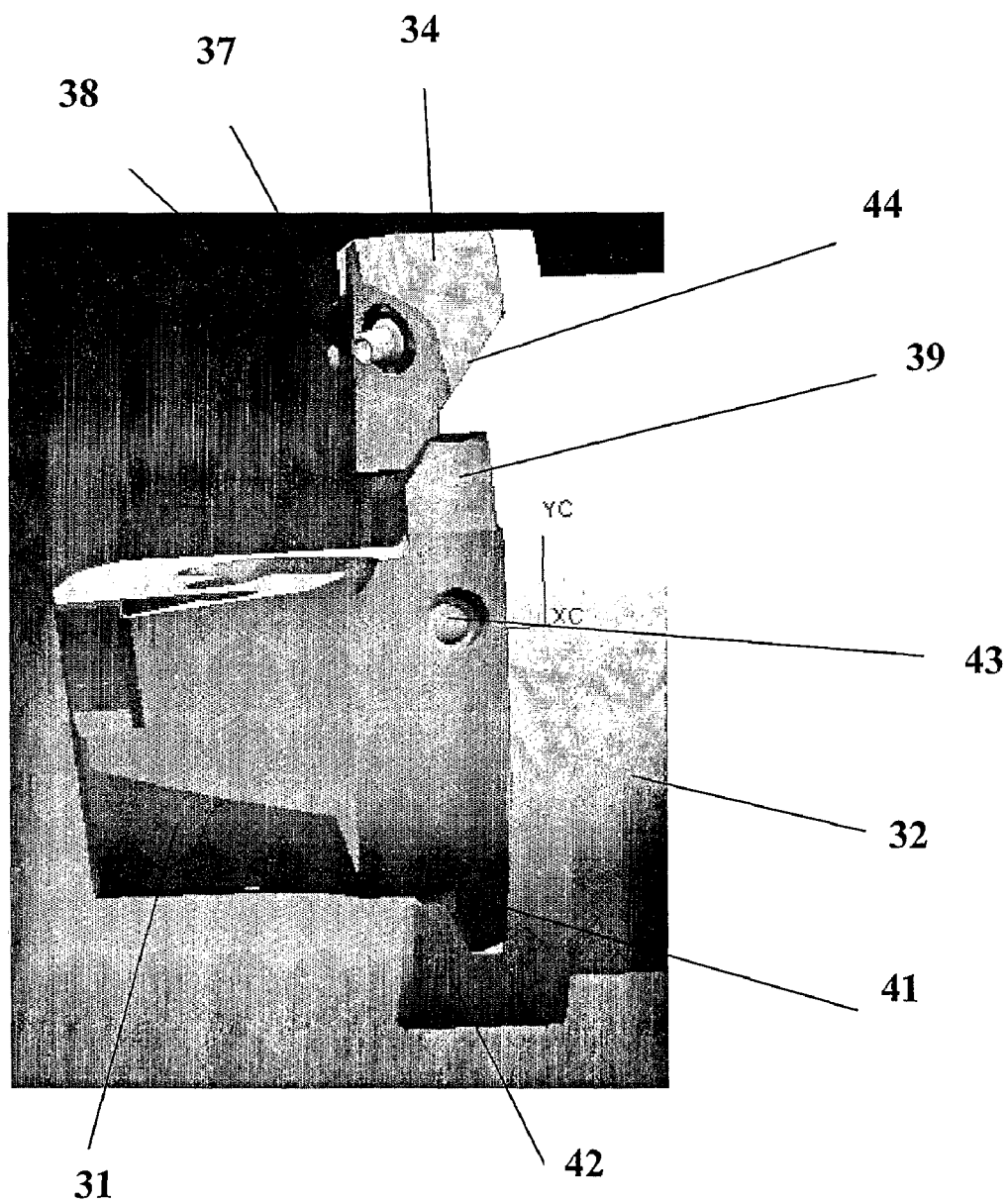
FIG. 4 is a perspective view of yet another embodiment of the invention.

FIG. 4 shows an embodiment that reassembles the embodiment shown in FIG. 3, but where an upper holding jaw 34 includes a more clearly angled face 44 between the holding jaw 34 and the adapter 32. The holding bolt 37 is shown angled at a certain angle adapted to the inclined face 44 and an inclined or angled contact face on the upper or first flange 39 of the cutting head 31. A boring 43 for an adjustment screw (not shown) is placed in the cutting head 31.

In the shown embodiments, the position of the cutting head in relation to the adapter can be adjusted in a direction sideways, such that an F-measure between the cutting bit of the cutting head and the center of the adapter can be adjusted.

When the holding bolt 37 on FIG. 4 is tightened, the holding jaw 34 will press the cutting head 31 in and down and ensure that flange 41 with a conical shape is pressed down into a corresponding conical recess in the wedge shaped holding part 42. Nozzles 38 for bringing forward cutting liquid is shown placed in the upper holding jaw 34.

In the shown embodiments, fixing devices are shown in form of holding bolts for tightening the holding jaws. However other forms of fixing of the holding jaws or clamps can be used, without parting from the invention. For instance the holding jaws can be secured with fixing devices in the form of a handle with a cam for clamping the jaw, or can be tightened in any other way.

The invention claimed is:

1. A system for clamping a cutting head to an adapter for a machine tool and for providing an infinitely adjustable F-measure between the adapter and a cutting bit, said system comprising:
   a first substantially linear flange on the cutting head, and a second substantially linear flange substantially parallel to the first substantially linear flange on the cutting head;
   a protrusion on the cutting head with an area for securing the cutting bit and means on the cutting head for securing a cutting bit on the protrusion;
   a first holding jaw for engagement with the first substantially linear flange on the cutting head;
   a clamping device for clamping the first holding jaw to the adapter and for moving the first holding jaw towards the first substantially linear flange; and
   a second holding jaw or holding part for engagement with the second substantially linear flange.

2. A system according to claim 1,
   wherein the clamping device is for clamping the first substantially linear flange to the adapter with the first holding jaw and includes a bolt.

3. A system according to claim 1,
   wherein the second holding jaw or holding part includes a keyway adapted to engage the second substantially linear flange on the cutting head.

4. A system according to claim 1,
   wherein the second holding jaw or holding part is clamped to the adapter with a bolt.

5. A system according to claim 1, further comprising
   first serrations on the cutting head being configured to interfit with second serrations on the adapter, the first and second serrations being parallel to the first substantially linear flange and the second substantially linear flange.

* * * * *